United States Patent [19]

Io et al.

[11] Patent Number: 4,573,258
[45] Date of Patent: Mar. 4, 1986

[54] METHOD OF MANUFACTURING MOTOR

[75] Inventors: Shinichi Io, Hatano; Funio Saeki, Atsugi, both of Japan

[73] Assignee: Atsugi Motor Parts Co., Ltd., Kanagawa, Japan

[21] Appl. No.: 689,996

[22] Filed: Jan. 9, 1985

[30] Foreign Application Priority Data

Jan. 18, 1984 [JP] Japan .................................. 59-6724

[51] Int. Cl.$^4$ ......................... H02K 15/02; B28B 7/22
[52] U.S. Cl. ..................................... 29/596; 264/255; 264/272.2; 310/43
[58] Field of Search .................... 29/596, 598; 310/43, 310/45; 264/272.2, 255

[56] References Cited

U.S. PATENT DOCUMENTS 3,184,527 5/1965 Fischer ............................... 264/255

Primary Examiner—Carl E. Hall
Attorney, Agent, or Firm—Lowe, King, Price & Becker

[57] ABSTRACT

In manufacturing a DC motor body (1) including a motor magnet (2), conventionally, a magnetized magnet (2) is fitted to one by one to the cylindrical molding core (11) and a motor body is injection-molded within a cavity formed between a motor body forming mold (10) and a cylindrical molding core (11) to which the magnet is attached. Therefore, the magnet should previously be molded and stocked before molding the motor body, thus not being applicable to mass-production processes. To overcome the above problems, the motor magnet (2) and the motor body (1) are molded in sequence in accordance with two separate molding steps by the use of the same molding core. This method can eliminate troublesome magnetic fitting work, the need of magnet stock and enhance the dimensional precision of motor magnet, thus being applicable to mass-production process while increasing the energy transduction efficiency of the DC motor.

6 Claims, 10 Drawing Figures

METHOD OF MANUFACTURING MOTOR

BACKGROUND OF THE INVENTION

1. Field of the Invention

The present invention relates generally to a method of manufacturing a motor and more specifically to a process of manufacturing a motor body including a magnetized motor magnet for a DC motor, for instance.

2. Description of the Prior Art

As is well known, DC motors are used in various industrial fields. In the DC motor, the motor body or motor housing made of a synthetic resin, for instance, is usually provided with a magnetized motor magnet, and a motor rotor including a motor coil is housed within the motor body so as to magnetically react with the motor magnet when current is passed through the motor coil by the aid of a pair of brushes attached to the motor body and a commutator attached to the motor rotor. In order to increase the energy transduction efficiency of the motor, it is preferable to reduce the clearance between the inner circumference of the magnet and the outer circumference of the rotor as much as possible and to such an extent that both the elements are not in contact with each other.

In a prior-art method of manufacturing the motor body including a magnet, a magnet is first fitted to a cylindrical portion of a molding core; secondly, the core having the magnet is inserted into a hollow cavity of a mold so as to form a cup-shaped space between the mold and the core having the magnet; thirdly, a resin material is injected into the cup-shaped space to form a motor body; fourthly, the core is extracted from the mold together with the magnet and the motor body, and the core is further extracted from the magnet and the motor body.

In the prior-art method as described above, however, there still exist several problems as follows: since the magnet should be magnetized before the molding of the motor body and further that the magnetized magnet should be fitted one by one to the molding core, the magnet should be manufactured accurately in dimensions and furthermore should previously be stocked before molding the motor body. That is to say, the prior-art method requires troublesome labor and is costly, thus being not well applicable to the mass-production process.

The prior-art method of manufacturing a motor body or a motor will be described in more detail hereinafter with reference to the attached drawings under Detailed Description of the Preferred Embodiments.

SUMMARY OF THE INVENTION

With these problems in mind, therefore, it is the primary object of the present invention to provide a method of manufacturing a motor body or a motor in which the motor magnet can be injection-molded as well as the motor body in order to eliminate one-by-one fitting process of the magnet to the molding core, enhance the dimensional precision of the magnet and to eliminate the need of stocking motor magnets before molding the motor body.

To achieve the above-mentioned object, the method of manufacturing a motor body having a motor magnet according to the present invention comprises the following steps of: (a) injecting a magnetic material into a space formed between a magnet forming mold and a magnet forming core to form a motor magnet; (b) extracting the molded magnet together with the magnet forming core from the magnet forming mold; (c) injecting a resin material into a space formed between a motor body forming mold and the molded magnet attached to the core to form a motor body including the motor magnet; (d) extracting the molded motor body including the molded motor magnet together with the core from the motor body forming mold; and (e) extracting the core from the extracted motor body including the molded motor magnet.

Further, in the method according to the present invention, the motor magnet is magnetized when a magnetic material is being injected to form the magnet or after the core has been extracted from the molded motor body including the molded motor magnet.

BRIEF DESCRIPTION OF THE DRAWINGS

The features and the advantages of the method of manufacturing a motor body or motor according to the present invention over the prior-art method will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate an understanding of the present invention, reference will be made to a prior-art method of manufacturing a motor with reference to the attached drawings.

Figure 1:
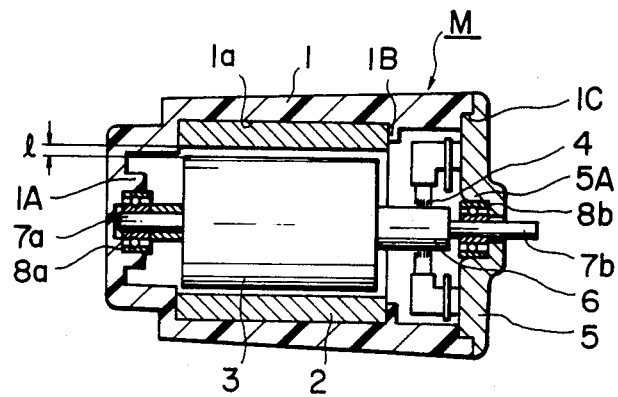
FIG. 1 is a cross-sectional view, partly in side view, of a typical DC motor for assistance in explaining the structure including various elements such as motor body, motor magnet, rotor, bearings, brushes, commutator, etc.

FIG. 1 is an exemplary structure of a DC motor M. The motor M is roughly made up of a cup-shaped motor body or housing 1, a cylindrical stator magnet 2 coaxially and fixedly fitted into a hollow cavity 1a of the motor body 1, a rotor 3 including a motor coil, a pair of brushes 4 attached to the motor body 1, and a motor cover disc 5. The rotor 2 further includes a commutator 6 and a motor rotor shaft 7a, 7b, being arranged coaxially with respect to the motor body 1, magnet 2, cover disc 5, etc. The rotor 3 is rotatably housed within the hollow cavity 1a of the motor body 1 with the rotor shaft 7a, 7b rotatably supported by a pair of bearings 8a and 8b. One bearing 8a is fixedly fitted to a bearing fitting portion 1A of the motor body 1; the other bearing 8b is fitted to the central portion 5A of the motor cover disc 5. In the motor shown in FIG. 1, a clearance 1 between the inner circumference of the cylindrical motor magnet 2 and the outer circumference of the rotor 3 should be as small as possible to such an extent that both elements are not in contact with each other in order to increase the transduction efficiency from electric energy to mechanical energy.

Figure 2:
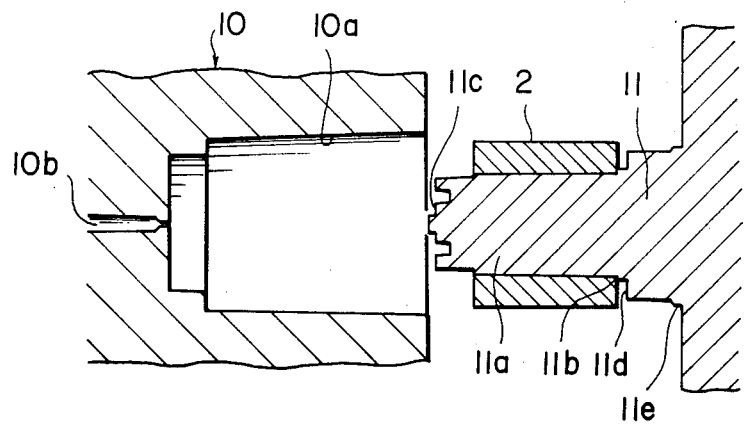
FIG. 2 is a cross-sectional view showing a motor body forming mold and a motor body molding core to which a magnet is fitted one by one in the prior-art method of manufacturing a motor body including a motor magnet.
Figure 3:
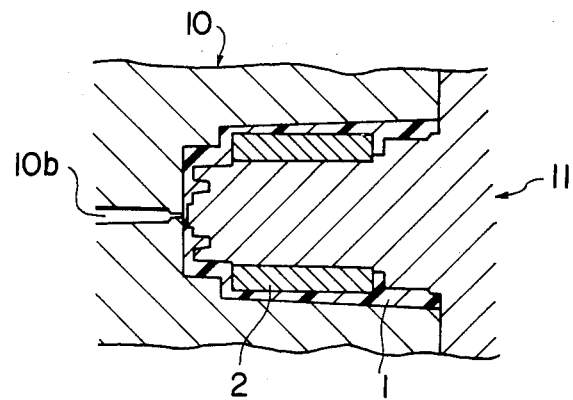
FIG. 3 is a cross-sectional view showing the motor body forming mold and the motor body molding core both combined with each other to form a cup-shaped cavity into which a synthetic resin is injected to form the motor body including the magnet in the prior-art method.
Figure 4:
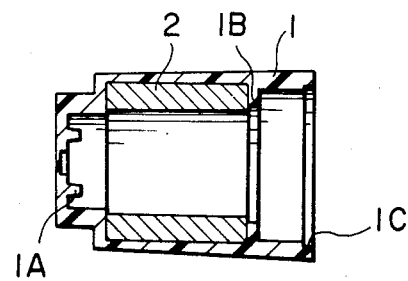
FIG. 4 is a cross-sectional view showing the motor body including the motor magnet after the motor body has been extracted from the motor body forming mold and further showing that the motor body molding core has been extracted from the molded motor body in the prior-art method.

With reference to FIGS. 2, 3 and 4, a prior-art method of manufacturing the motor M shown in FIG. 1 will be described hereinbelow. As shown in FIG. 2, first a body forming mold 10 having a hollow cavity 10a and a pouring gate 10b and a body molding core 11 having a cylindrical projection portion 11a are prepared. An already-magnetized motor magnet 2 is fitted to the cylindrical portion 11a of the molding core 11 as shown. In this fitting process, since the molding core 11 is made of a magnetic material, the magnet 2 is securely fixed to the end surface of a first shoulder portion 11b of the molding core 11 by a magnetic force developed between the magnet 2 and the core 11. Further, the molding core 11 is formed with an end surface 11c for shaping a bearing supporting portion, a second shoulder portion 11d for shaping a magnet supporting portion, and a third shoulder portion 11e for shaping a cover disc fitting portion. Secondly, the molding core 11 to which the magnet 2 is attached is inserted into the hollow cavity 10a of the mold 10, so that a cup-shaped space is formed between the inner circumference 10a of the mold 10 and the outer circumferences of the motor magnet 2 and of the remaining cylindrical portion 11a of the core 11. Thirdly, a synthetic resin material is injected through the pouring gate 10b into the cup-shaped space in order to form the motor body 1, as depicted in FIG. 3. In this molding material injection step, the bearing fitting portion 1A, a magnet supporting portion 1B and a cover disc fitting portion 1C of the motor body 1 are shaped simultaneously. In more detail, the bearing fitting portion 1A is formed by the end surface 11c of the cylindrical portion 11a of the molding core 11; the magnet supporting portion 1B is formed by the first and second shoulder portion 11b and 11d of the molding core 11; the motor cover disc fitting portion 1C is formed by the third shoulder portion 11e of the molding core 11.

Next, the core 11 having the magnet 2 and the motor body 1 is extracted from the mold 10 and further the core 11 is extracted from the motor body 1 having the magnet 2. FIG. 4 shows a motor body 1 with the motor magnet 2 molded by the above molding processes, in which the magnet 2 is integrally fitted to the cylindrical inner circumference of the motor body 1.

Thereafter, one bearing 8a is tightly fitted to the bearing fitting portion 1A of the motor body 1; the rotor 3 is inserted into the motor body 1 with one end 7a of the rotor shaft 7 rotatably fitted to the bearing 8a. Further, the other bearing 8b is fixedly fitted to the central portion of the already-molded motor cover disc 5; the other end 7b of the rotor shaft 7 is passed through the bearing 8b; the motor cover disc 5 is fitted to the cover disc fitting portion 1C of the motor body 1 with the brushes 4 carefully brought into slidable contact with the outer periphery of the commutator 6.

According to the prior-art method of manufacturing the motor body 1 as explained above, since it is possible to simultaneously shape the bearing fitting portion 1A and the cover disc fitting portion 1C with the magnet 2 coaxially supported within the motor body 1, it is possible to accurately determine the mutual position relationship between the motor body 1 and the motor cover disc 5; in other words, between the two bearings 8a and 8b with respect to the magnet 2. Therefore, when the rotor shaft 7, 7b is supported by these two bearings 8a and 8b, it is possible to reduce the clearance 1 between the inner circumference of the magnet 2 and the outer circumference of the rotor 3 as small as possible, so that the energy transduction efficiency of the motor is fairly increased.

In this prior-art method of manufacturing a motor body or motor, however, there still exist some drawbacks. The basic problems are: since the motor magnet 2 should be magnetized before the motor body molding process and the magnetized magnet 2 can be fitted one by one to the cylindrical portion 11a of the molding core 11, troublesome work is required in the manufacturing process. Further, since the molding core for forming the magnet is different from molding core 11 for molding the motor body, there inevitably exists play between the inner circumference of the magnet 2 and the outer circumference of the motor body molding core 11; that is, it is rather difficult to accurately locate the magnet 2 within the hollow cavity 10a of the mold 10 with respect to the end surface 11c for shaping the bearing supporting portion 1A and the third shoulder 11e for shaping the cover disc fitting portion 1C. Furthermore, since the magnetized magnets should be stocked before the motor body molding process, a storage place is necessary, and additionally magnet stock cost is required. In summary, the prior-art method is troublesome and costly, and not well applicable to mass-production process.

In view of the above description, reference is now made to a method of manufacturing a DC motor according to the present invention. The feature of the present invention is to mold the magnet and the motor body in sequence in accordance with two separate molding steps by use of the same molding core.

Figure 5:
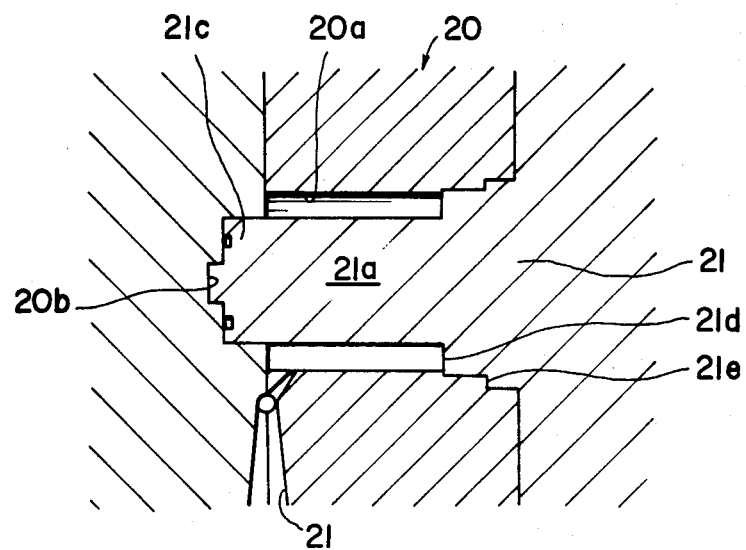
FIG. 5 is a cross-sectional view showing a motor magnet forming mold and a motor magnet molding core both combined with each other to form a cylindrical cavity into which a magnetic material is injected to form a motor magnet in the method of manufacturing a motor magnet before molding a motor body according to the present invention.

With reference to FIG. 5, first a magnet forming mold 20 having a hollow cavity 20a, a bottom cavity 20b and a pouring gate 21 and a magnet molding core 21 having a cylindrical projection portion 21a are prepared. The magnet-molding core 21 is formed with an end surface 21c for shaping a bearing supporting portion 1A, a first shoulder 21d for shaping a magnet edge, and a second shoulder 21e for shaping a motor cover disc fitting portion 1C. The diameter of the second shoulder 21e is greater than that of the first shoulder 21d.

Secondly, the magnet molding core 21 having the cylindrical projection portion 21a is inserted into the hollow cavity 20a of the magnet forming mold 20 with the end surface 21c of the core 21 fitted into the bottom cavity 20b of the mold 20, so that a cylindrical space can be formed between the inner circumference 20a of the mold 20 and the outer circumference of the cylindrical projection portion 21a of the molding core 21.

Figure 6:
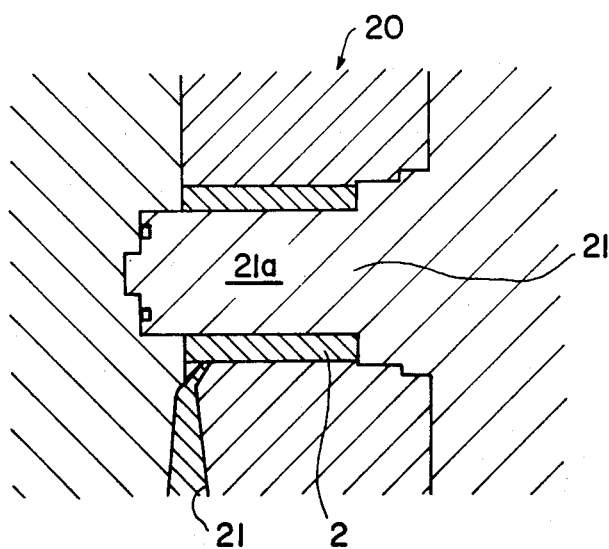
FIG. 6 is a cross-sectional view similar to FIG. 5, in which a magnetic material is injected to form a motor magnet in the method according to the present invention.

Thirdly, as depicted in FIG. 6, a magnet forming material, that is, a magnetic material is injected into the cylindrical space through a pouring gate 21, under application of magnetizing force radially with respect to the cylindrical portion 21a, in order to magnetize the injected magnetic material. That is to say, being different from the prior-art method, the magnet 2 is first formed around the molding core 21 by combining the molding step and magnetizing step together. The magnetic forming material is a synthetic resin including ferrite powder, for instance. Further, since the magnetic field is applied radially with respect to the cylindrical magnet 2, magnetic domain are arranged radially with respect to the cylindrical magnet 2 so that magnetic action can be obtained between the magnet 2 and rotor 3 when current is passed through a rotor coil (not shown) through two brushes 4 and the commutator 6.

Fourthly, the magnetic molding core 21 is extracted together with the molded and magnetized magnet 2 from the magnet forming mold 20.

Although the manufacturing method has been explained in the case where a magnetic field is applied when the magnetic material is being injected to form a magnet, it is also possible to magnetize the magnet 2 after the magnet 2 has been molded. That is to say, the magnet 2 can be magnetized after having been extracted from the mold 20 together with the core 21 or after the motor body 1 has been molded around the magnet 2 in accordance with the steps described below.

Figure 7:
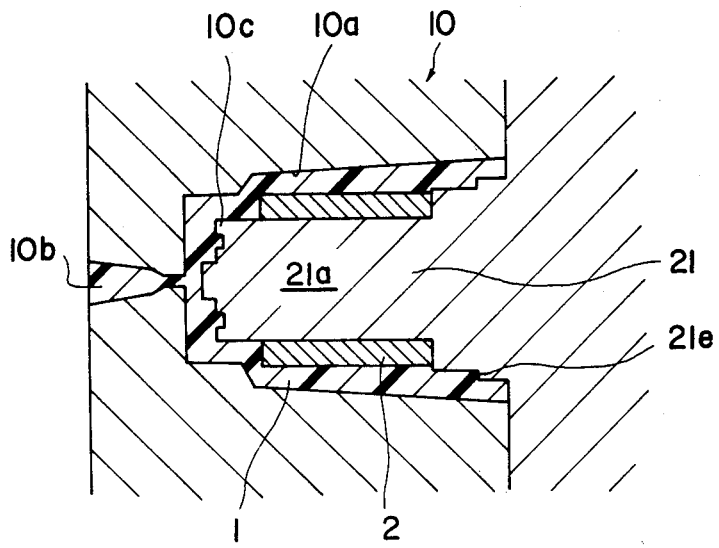
FIG. 7 is a cross-sectional view showing the motor body forming mold and the motor body molding core both combined with each other to form a cup-shaped cavity into which a synthetic resin is injected to form a motor body including the magnet in the method according to the present invention.

The succeeding manufacturing steps are almost similar to those in the prior-art method as follows: As shown in FIG. 7, a motor body forming mold 10 having a hollow cavity 10a and a pouring gate 10b is prepared. The magnet molding core 21 having an already-molded magnet 2 is inserted into the hollow cavity 10a of the mold 10, so that a cup-shaped space can be formed between the inner circumference 10a of the mold 10 and the outer circumferences of the motor magnet 2 and of the remaining cylindrical portion 21a of the magnet molding core 21. A synthetic resin material is injected through the pouring gate 10b into the cup-shaped space in order to mold the motor body 1. In this molding material injecting step, the bearing fitting portion 1A of the motor body 1 and the motor cover disc fitting portion 1C are both formed simultaneously. In more detail, the bearing fitting portion 1A is shaped by the end surface 21c of the cylindrical portion 21a of the magnet molding core 21; the motor cover disc fitting portion 1C is shaped by the second shoulder portion 21e of the magnet molding core 21.

The core 21 including the molded magnet 2 and the molded motor body 1 is extracted from the mold 10 and further the core 21 is extracted from the motor body 1 including the magnet 2. At this time, the magnet 2 molded on the inner circumference of the motor body 1 is magnetized if necessary.

Figure 8:
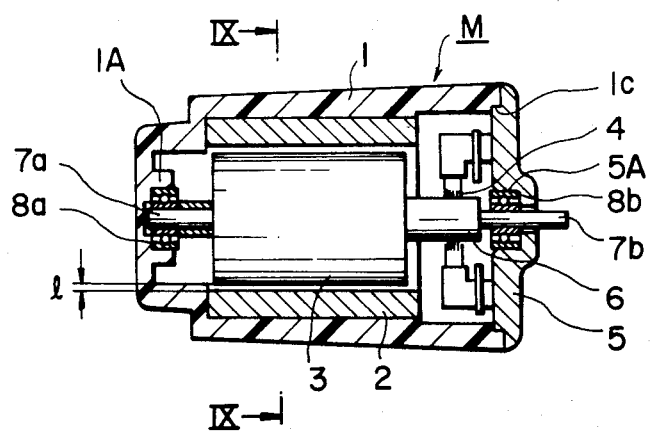
FIG. 8 is a cross-sectional view, partly in side view, of a DC motor manufactured in accordance with the method according to the present invention.

Thereafter, as shown in FIG. 8, one bearing 8a is tightly fitted to the bearing fitting portion 1A of the motor body 1; the rotor 3 is inserted into the motor body 1 with one end 7a of the rotor shaft 7 rotatably fitted to the bearing 8a. Further, the other bearing 8b is tightly fitted to the central portion 5A of the motor cover disc 5; the other end 7b of the rotor shaft 7 is passed through the bearing 8b; the motor cover disc 5 is fitted to the cover disc fitting portion 1C of the motor body 1 with the brushes carefully 4 brought into slidable contact with the outer periphery of the commutator 6.

FIG. 8 shows a cross-sectional view of a DC motor manufactured in accordance with the method according to the present invention. Since the structure thereof is almost the same as that shown in FIG. 1, the description thereof is omitted herein. However, it should be noted that the only difference between the two in structure is that the motor body 1 shown in FIG. 1 has a magnet holding projection 1B formed within the hollow cavity 1a of the motor body 1 but the motor body 1 shown in FIG. 8 does not have a magnetic holding projection 1B. This is because in the method according to the present invention, the same molding core 21 is used for molding the magnet 2 and the motor body 1 without changing the core. Therefore, when the core 21 used for molding the magnet 2 is replaced with another core having a cavity to form the magnet holding projection 1B as shown in FIG. 2 before molding the motor body, it is possible to easily form the magnet holding projection 1B as in the conventional motor body 1. However, it is not preferable to change the magnet molding core 11 before the motor body is molded from the standpoint of manufacturing precision. And, even if no magnet holding projection 1B is provided, the magnet 2 is not easily removed from the motor body 1 because the motor body 1 is injection-molded on the outer surface of the cylindrical magnet 2.

Figure 9:
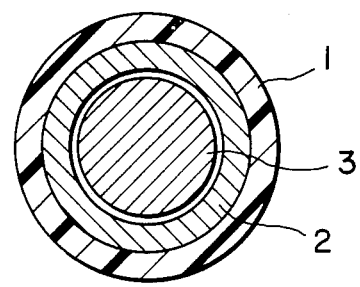
FIG. 9 is a cross-sectional view taken along the line IX—IX shown in FIG. 8, in which a cylindrical motor magnet is molded on the inner circumference of the cylindrical motor body.
Figure 10:
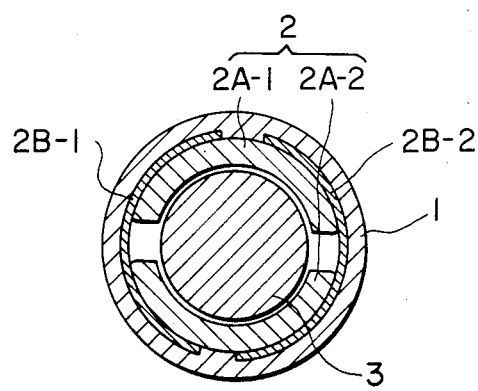
FIG. 10 is a cross-sectional view similar to FIG. 9, in which a pair of yokes are attached to the inner circumference of the motor body and a pair of roughly semicylindrical motor magnets ae molded on the inner surfaces of the yokes, showing one aspect of the motor magnet of the DC motor which can be manufactured in accordance with the method according to the present invention.

FIG. 9 shows a cross-sectional view taken along the line IX—IX shown in FIG. 8. FIG. 9 indicates that a cylindrical magnet 2 is molded in contact with the inner surface of the motor body 1 by the manufacturing method according to the present invention. However, without being limited to this cylindrical magnet structure, it is also possible to form a pair of roughly semicylindrical magnets 2A-1 and 2A-2 so connected as to function as a cylindrical magnet by the aid of a pair of semicylindrical yokes 2B-1 and 2B-2. In this case, a pair of the semicylindrical yokes 2B-1 and 2B-2 are first inserted into the hollow cavity 20a of the magnet forming mold 20 before inserting the magnet molding core 21 into the mold 20. Further, a pair of projections corresponding to the spaces developed between the two separate semicylindrical magnets should be formed on the outer surface of the magnet forming core 21. Furthermore, the projections corresponding to the spaces should be located near the middle portion of the semicylindrical yokes.

As described above, in the method of manufacturing a DC motor body or a DC motor according to the present invention, since the motor magnet 2 and the motor body 1 can be molded in sequence in accordance with two separate molding steps by the use of the same molding core or without changing the molding core, it is possible to eliminate troublesome work (one-by-one fitting of magnet to the core) and magnet stock management. Further, since the motor magnet 2 can be formed by an injection molding method similarly to the motor body molding method, it is possible to manufacture the magnet easily and precisely and to further reduce the clearance 1 between the inner circumference of the magnet 2 and the outer circumference of the rotor 3 to its minimum value for increasing motor energy transduction efficiency as compared with the motor manufactured in accordance with the prior-art method. In the method according to the present invention, it is unnecessary to stock the motor magnet, so that the method is applicable to mass-production process.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A method of manufacturing a motor body including a motor magnet, which comprises the following steps of:
   (a) injecting a magnetic material into a space formed between a magnet forming mold and a magnet molding core in accordance with an injection molding method, while applying a magnetizing force to the injected magnetic material, to mold a motor magnet;
   (b) extracting the molded magnetized magnet together with the magnet molding core from the magnet forming mold;
   (c) injecting a resin material into a space formed between a motor body forming mold and the magnet molding core having the molded and magnetized magnet in accordance with an injection molding method to mold a motor body including the motor magnet (2);
   (d) extracting the molded motor body including the molded and magnetized magnet together with the magnet molding core from the motor body forming mold; and
   (e) extracting the magnet molding core from the extracted motor body including the magnetized motor magnet.

2. A method of manufacturing a motor body including a motor magnet, which comprises the following steps of:
   (a) injecting a magnet material into a space formed between a magnet forming mold and a magnet molding core in accordance with an injection molding method to mold a non-magnetized motor magnet;
   (b) extracting the molded non-magnetized motor magnet together with the magnet molding core from the magnet forming mold;
   (c) injecting a resin material into a space formed between a motor body forming mold and the magnet core (21) having a molded and non-magnetized magnet in accordance with an injection molding method to mold a motor body including the motor magnet;
   (d) extracting the molded motor body including the molded non-magnetized magnet together with the magnet molding core from the motor body forming mold; and
   (e) extracting the magnet molding core from the extracted motor body including the non-magnetized motor magnet; and
   (f) magnetizing the extracted motor magnet molded on the inner surface of the motor body.

3. A method of manufacturing a motor which comprises the following steps of:
   (a) inserting a cylindrical magnet molding core formed with an end surface for shaping a bearing supporting portion, a first shoulder for shaping a magnet edge and a second shoulder having a diameter greater than that of the first shoulder for shaping a motor cover disc fitting portion into a hollow cavity of a magnet forming mold so as to form a cylindrical cavity between the inner circumference of the magnet forming mold and the outer circumference of the cylindrical magnet molding core;
   (d) injecting a magnetic material into a cylindrical cavity between the mold and the core to mold a motor magnet in accordance with an injection molding method to mold a motor magnet;
   (e) extracting molding core and the molded motor magnet together from the magnet forming mold (20);
   (f) inserting the extracted molding core including the molded motor magnet into a cylindrical hollow cavity of a motor body forming mold so as to form a cup-shaped cavity between the inner circumference of the motor body forming mold and the outer circumferences of the motor magnet and the molding core (21);
   (g) injecting a synthetic resin material into the cup-shaped cavity between the motor body forming mold and the magnet molding core having the molded magnet in accordance with an injection molding method to mold a motor body including the motor magnet;
   (h) extracting the molded motor body including the molded magnet together with the magnet molding core from the motor body forming mold (10);
   (i) extracting the magnet forming core from the motor body including the motor magnet;
   (j) fitting a first bearing to a bearing supporting portion of the motor body and passing one end of a motor shaft of a motor rotor through the first bearing;
   (k) preparing a motor cover disc having a central bearing supporting portion;
   (l) fitting a second bearing to the central bearing supporting portion of the motor cover disc and passing the other end of the motor shaft of the motor rotor through the second bearing; and
   (m) fitting the motor cover disc to a cover disc fitting portion of the motor body while bringing a pair of brushes attached to the cover disc into slidable contract with a commutator attached to the motor rotor.

4. The method of manufacturing a motor a set forth in claim 3, wherein the magnetic material is magnetized when the magnetic material is being injected into the cylindrical cavity formed between the magnet forming mold and the magnet molding core.

5. The method of manufacturing a motor as set forth in claim 3, wherein the magnetic material is magnetized after the magnet forming core has been extracted from the motor body including the motor magnet in step (i) of claim 2.

6. The method of manufacturing a motor as set forth in claim 3, wherein a pair of semicylindrical magnetic yokes are inserted into the hollow cavity of the magnet forming mold before inserting the cylindrical magnet molding core, having a pair of projections corresponding to spaces developed between two separate semicylindrical magnets on the outer surface thereof, into the hollow cavity of the magnet forming mold in such a way that the projections corresponding to the spaces are located near the middle portion of the semicylindrical yokes.

* * * * *